United States Patent
Kodama et al.

(10) Patent No.: US 7,199,300 B2
(45) Date of Patent: Apr. 3, 2007

(54) INFORMATION SEARCH APPARATUS, INFORMATION SEARCH METHOD, AND INFORMATION RECORDING MEDIUM ON WHICH INFORMATION SEARCH PROGRAM IS COMPUTER-READABLY RECORDED

(75) Inventors: Yasuteru Kodama, Tsurugashima (JP); Yasunori Suzuki, Tsurugashima (JP); Satoshi Odagawa, Tsurugashima (JP); Takehiko Shioda, Tsurugashima (JP)

(73) Assignee: Pioneer Corporation, Meguro-Ku, Tokyo (JP)

( * ) Notice: Subject to any disclaimer, the term of this patent is extended or adjusted under 35 U.S.C. 154(b) by 106 days.

(21) Appl. No.: 11/011,020

(22) Filed: Dec. 9, 2004

(65) Prior Publication Data

US 2005/0126371 A1 Jun. 16, 2005

(30) Foreign Application Priority Data

Dec. 10, 2003 (JP) .......................... P2003-412395

(51) Int. Cl.
*G10H 1/00* (2006.01)
*G10H 7/00* (2006.01)

(52) U.S. Cl. .......................... 84/601; 84/609; 84/615; 84/616; 84/477 R

(58) Field of Classification Search .................. None
See application file for complete search history.

(56) References Cited

U.S. PATENT DOCUMENTS

| | | | | |
|---|---|---|---|---|
| 5,616,876 A | | 4/1997 | Cluts ........................... | 84/609 |
| 5,739,451 A | * | 4/1998 | Winksy et al. ................ | 84/609 |
| 6,188,010 B1 | | 2/2001 | Iwamura ....................... | 84/609 |
| 6,504,089 B1 | * | 1/2003 | Negishi et al. ............... | 84/609 |
| 6,528,715 B1 | | 3/2003 | Gargi .......................... | 84/615 |
| 6,678,680 B1 | * | 1/2004 | Woo ............................. | 707/6 |
| 6,689,946 B2 | * | 2/2004 | Funaki ......................... | 84/478 |

(Continued)

FOREIGN PATENT DOCUMENTS

EP 1 304 628 A2 4/2003

(Continued)

OTHER PUBLICATIONS

Bainbridge, D., et al., "Towards a Digital Library of Popular Music," *Proceedings of the ACM International Conference on Digital Libraries*, pp. 161-169 (1999).

*Primary Examiner*—Marlon Fletcher
(74) *Attorney, Agent, or Firm*—Ladas & Parry LLP

(57) ABSTRACT

The song search apparatus for searching a song among songs including lyrics and performances, comprises: a song feature information database which stores song feature information indicating acoustic feature of the performances or feature of the lyrics included in the songs; an input unit which inputs a search word representing the song to be searched and formed of a word representing a subjectivity; a search song feature information database which stores search song feature information indicating the acoustic feature or the feature of the lyrics of the songs; a search process unit which compares input search song feature information corresponding to the inputted search word with each of the stored song feature information, extracts a song most similar to the input search song feature information, and makes a display display an image indicating the input search song feature information and an image indicating the song feature information of the extracted song.

14 Claims, 10 Drawing Sheets

U.S. PATENT DOCUMENTS

| | | | |
|---|---|---|---|
| 2003/0078919 A1 | 4/2003 | Suzuki et al. | 707/3 |
| 2004/0030691 A1* | 2/2004 | Woo | 707/3 |
| 2004/0123724 A1* | 7/2004 | Funaki | 84/478 |
| 2004/0144238 A1* | 7/2004 | Gayama | 84/613 |
| 2005/0241463 A1* | 11/2005 | Urata | 84/609 |
| 2006/0065105 A1* | 3/2006 | Iketani et al. | 84/609 |
| 2006/0106867 A1* | 5/2006 | Burges et al. | 707/104.1 |

FOREIGN PATENT DOCUMENTS

| | | |
|---|---|---|
| EP | 1542139 A1 * | 6/2005 |
| JP | 2000-122770 | 4/2000 |

* cited by examiner

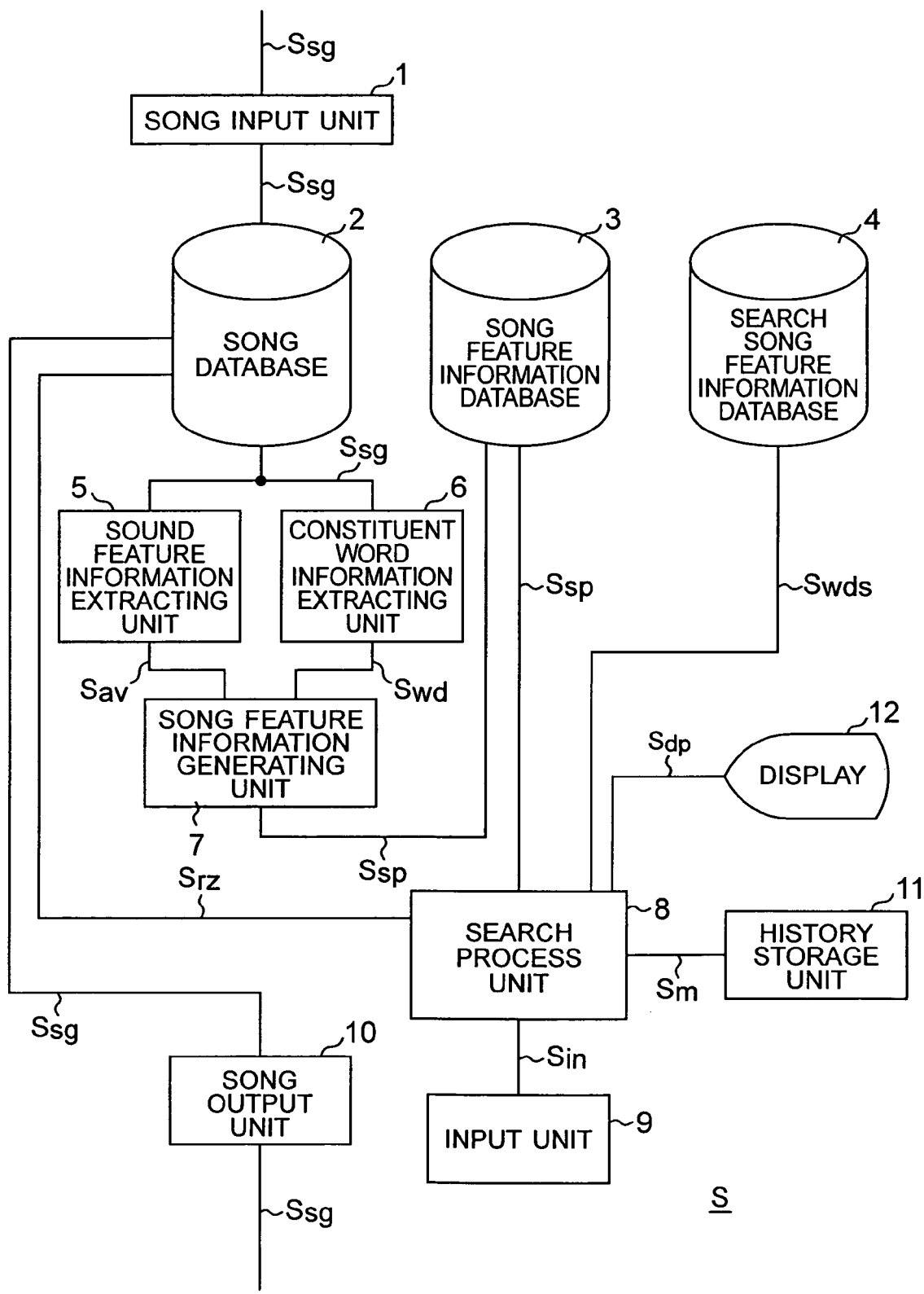

FIG. 2A

| MUSIC NUMBER | CONSTITUENT WORDS | | | | | SOUND FEATURE INFORMATION | | | |
|---|---|---|---|---|---|---|---|---|---|
| | LOVE | SEA | WISH | HOPE | ... | BPM | MAXIMUM LEVEL | AVERAGE LEVEL | ... |
| 0 | 1 | 0 | 0 | 0 | ... | 129 | 234 | 123 | |
| 1 | 1 | 1 | 0 | 1 | ... | 189 | 345 | 231 | |
| 2 | 0 | 0 | 0 | 0 | ... | 80 | 123 | 88 | |
| 3 | 0 | 0 | 1 | 1 | ... | 150 | 334 | 298 | |
| 4 | 1 | 1 | 1 | 0 | ... | 102 | 235 | 150 | |
| 5 | 0 | 0 | 1 | 0 | ... | 86 | 198 | 75 | |
| ... | ... | ... | ... | ... | ... | ... | ... | ... | |

FIG. 2B

| SEARCH ID | SEARCH WORD | VOCAL FEATURE INFORMATION | | | | SOUND FEATURE INFORMATION | | | |
|---|---|---|---|---|---|---|---|---|---|
| | | HEART-WARMING | CHEERFUL | SAD/LONELY | ENCOURAGING | BPM | MAXIMUM LEVEL | AVERAGE LEVEL | ... |
| 0 | HEARTWARMING | 0.9 | 0 | 0.1 | 0.3 | 129 | 234 | 123 | |
| 1 | CHEERFUL | 0.2 | 0.7 | 0 | 0.5 | 189 | 345 | 231 | |
| 2 | SAD/LONELY | 0.3 | 0 | 0.8 | 0 | 80 | 123 | 88 | |
| 3 | ENCOURAGING | 0 | 0 | 0.3 | 0.9 | 150 | 334 | 298 | |
| 4 | CALM | 0 | 0.7 | 0.5 | 0.1 | 102 | 235 | 150 | |
| ... | ... | ... | ... | ... | ... | ... | ... | ... | |

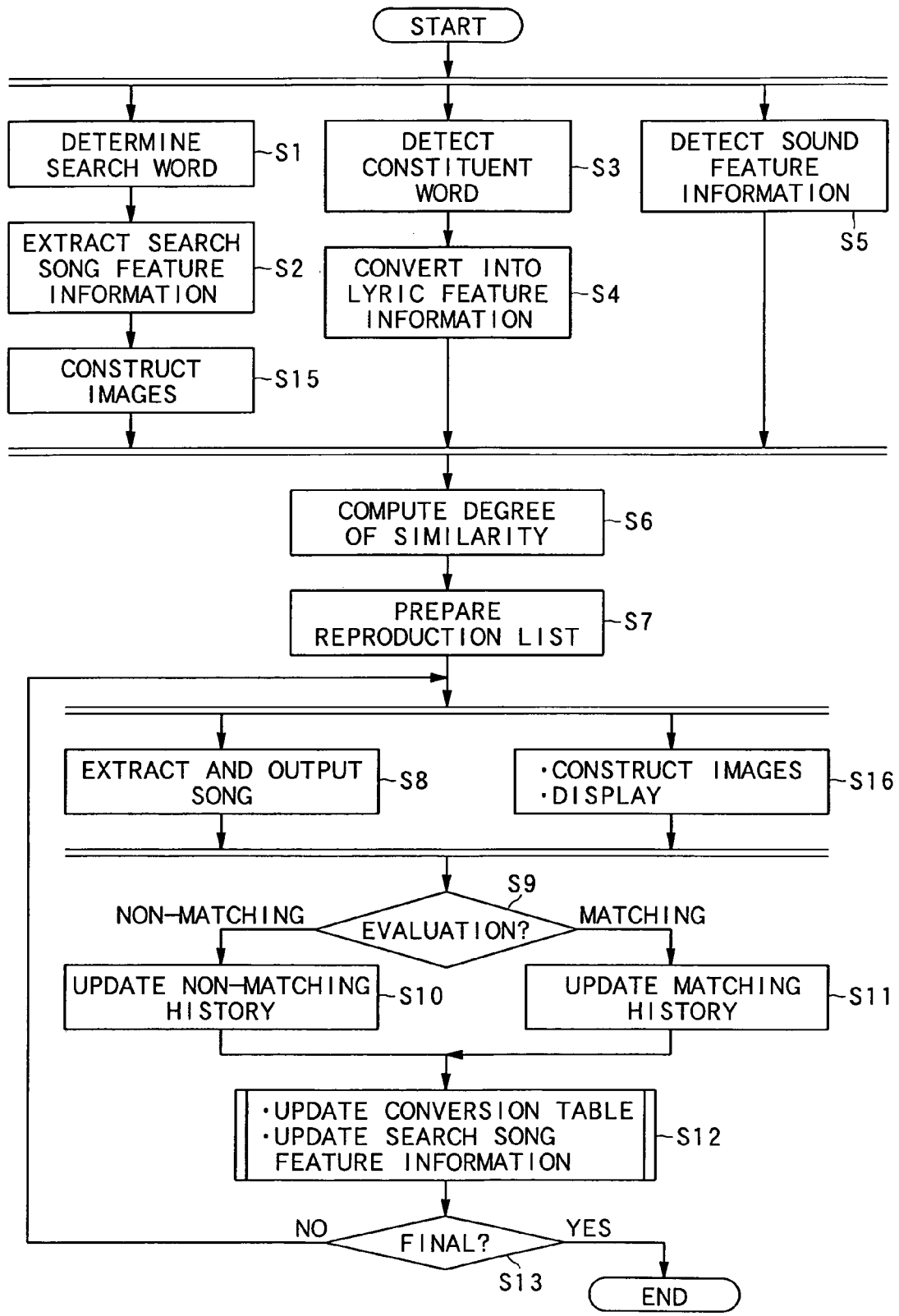

FIG. 6A

| ORDER | CONSTITUENT WORDS | | | | | SOUND FEATURE INFORMATION | | | | VOCAL FEATURE INFORMATION | | | |
|---|---|---|---|---|---|---|---|---|---|---|---|---|---|
| | LOVE | SEA | WISH | HOPE | ... | BPM | MAXIMUM LEVEL | AVERAGE LEVEL | ... | HEART-WARMING | CHEERFUL | SAD/LONELY | ENCOURAGING |
| 0 | 0 | 1 | 0 | 0 | | 129 | 234 | 123 | | 0.9 | 0.1 | 0 | 0 |
| 1 | 1 | 1 | 0 | 1 | | 189 | 345 | 231 | | 0.3 | 0 | 0.5 | 0.4 |
| 3 | 0 | 0 | 0 | 0 | | 80 | 123 | 88 | | 0 | 0.7 | 0.7 | 0.8 |
| 5 | 0 | 1 | 0 | 1 | | 150 | 334 | 298 | | 0 | 0 | 0 | 0 |
| 8 | 1 | 0 | 0 | 0 | | 102 | 235 | 150 | | 0.1 | 0 | 0.3 | 0.1 |

FIG. 6B

| ORDER | CONSTITUENT WORDS | | | | | SOUND FEATURE INFORMATION | | | | VOCAL FEATURE INFORMATION | | | |
|---|---|---|---|---|---|---|---|---|---|---|---|---|---|
| | LOVE | SEA | WISH | HOPE | ... | BPM | MAXIMUM LEVEL | AVERAGE LEVEL | ... | HEART-WARMING | CHEERFUL | SAD/LONELY | ENCOURAGING |
| 2 | 0 | 1 | 0 | 0 | | 129 | 234 | 123 | | 0.2 | 0 | 0 | 0.3 |
| 4 | 1 | 0 | 1 | 1 | | 189 | 345 | 231 | | 0 | 0.4 | 0.1 | 0 |
| 6 | 0 | 0 | 0 | 0 | | 80 | 123 | 88 | | 0 | 0 | 0.9 | 0.6 |
| 7 | 0 | 0 | 0 | 1 | | 150 | 334 | 298 | | 0.4 | 0 | 0 | 0 |

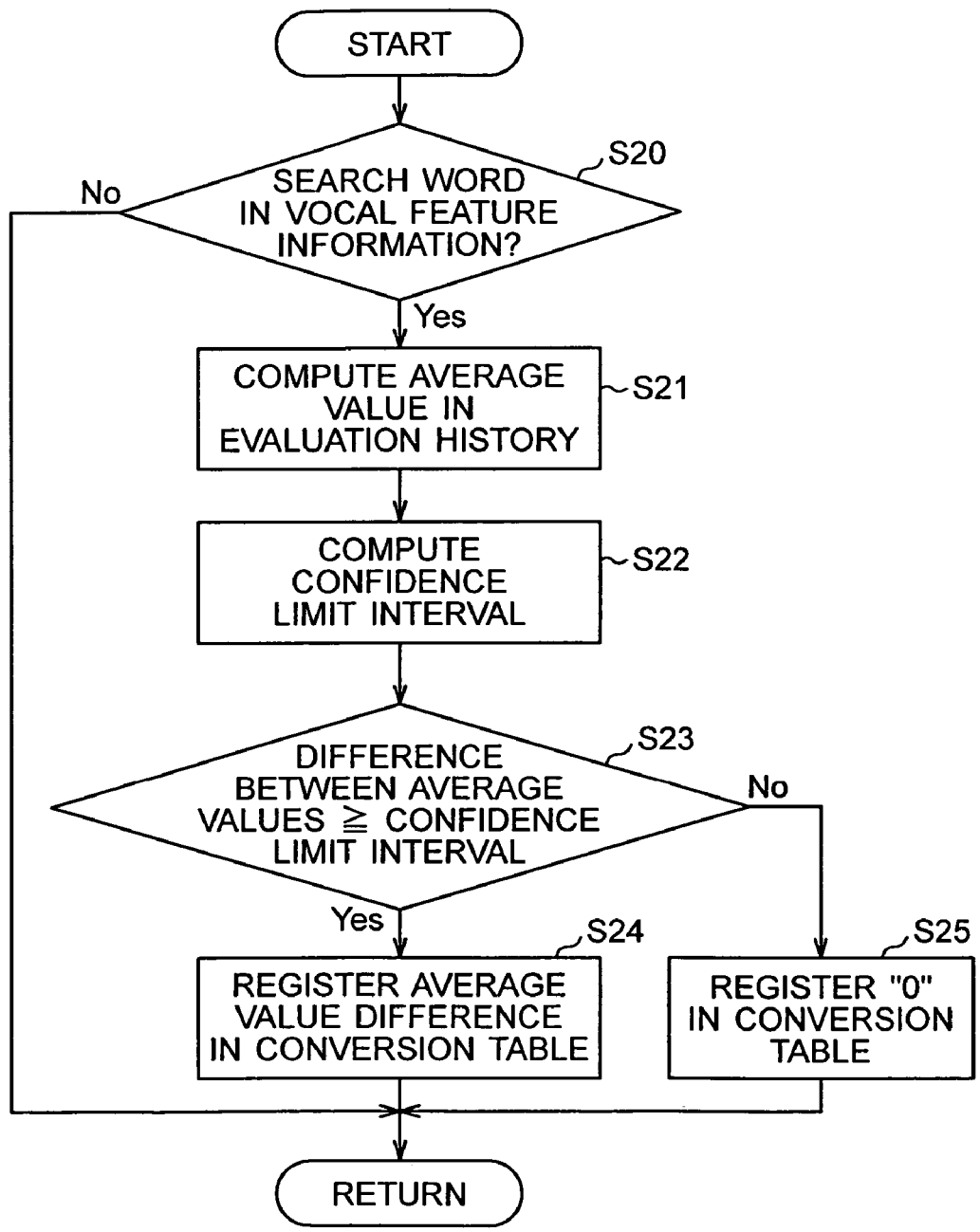

FIG. 8

| STORAGE ADDRESS | SEARCH WORD "HEART-WARMING" ||||||||||||||
|---|---|---|---|---|---|---|---|---|---|---|---|---|---|---|
| | MATCHING HISTORY INFORMATION ||||||||||||||
| | CONSTITUENT WORDS |||||KEYS |||||||||
| | LOVE | SEA | THO-UGHT | HOPE | ... | C MAJOR | A MINOR | F MAJOR | D MINOR | B FLAT MAJOR | G MINOR | E FLAT MAJOR | ... | G MAJOR | E MINOR |
| 0 | 0 | 1 | 0 | 0 | | 0 | 1 | 0 | 0 | 0 | 0 | 0 | | 0 | 0 |
| 1 | 0 | 1 | 1 | 0 | | 1 | 0 | 0 | 0 | 0 | 0 | 0 | | 0 | 0 |
| 2 | 0 | 1 | 1 | 0 | | 0 | 1 | 0 | 0 | 0 | 0 | 0 | | 0 | 0 |
| 3 | 0 | 1 | 0 | 0 | | 0 | 0 | 1 | 0 | 0 | 0 | 0 | | 0 | 0 |
| 4 | 1 | 1 | 0 | 0 | | 0 | 0 | 0 | 0 | 1 | 0 | 0 | | 0 | 0 |
| 5 | 1 | 1 | 0 | 0 | | 1 | 0 | 0 | 0 | 0 | 0 | 0 | | 0 | 0 |
| 6 | 0 | 1 | 0 | 0 | | 0 | 1 | 0 | 0 | 0 | 0 | 0 | | 0 | 0 |
| 7 | 1 | 0 | 0 | 1 | | 0 | 0 | 0 | 0 | 0 | 0 | 0 | | 1 | 0 |
| 8 | 0 | 1 | 0 | 1 | | 1 | 0 | 0 | 0 | 0 | 0 | 0 | | 0 | 0 |
| 9 | 1 | 1 | 0 | 0 | | 0 | 1 | 0 | 0 | 0 | 0 | 0 | | 0 | 0 |
| 10 | 0 | 1 | 0 | 0 | | 0 | 1 | 0 | 0 | 0 | 0 | 0 | | 0 | 0 |
| 11 | 0 | 0 | 1 | 0 | | 0 | 1 | 0 | 0 | 0 | 0 | 0 | | 0 | 0 |
| 12 | 0 | 1 | 0 | 0 | | 0 | 1 | 0 | 0 | 0 | 0 | 0 | | 0 | 0 |
| 13 | 0 | 1 | 0 | 0 | | 0 | 1 | 0 | 0 | 0 | 0 | 0 | | 0 | 0 |
| 14 | 0 | 1 | 0 | 0 | | 0 | 0 | 0 | 0 | 0 | 0 | 1 | | 0 | 0 |
| 15 | 0 | 1 | 0 | 0 | | 0 | 0 | 0 | 0 | 1 | 0 | 0 | | 0 | 0 |
| 16 | 0 | 1 | 0 | 0 | | 0 | 0 | 0 | 0 | 0 | 1 | 0 | | 0 | 0 |
| 17 | 0 | 1 | 1 | 0 | | 0 | 1 | 0 | 0 | 0 | 0 | 0 | | 0 | 0 |
| 18 | 1 | 0 | 0 | 0 | | 0 | 0 | 0 | 1 | 0 | 0 | 0 | | 0 | 0 |
| 19 | 0 | 1 | 0 | 0 | | 0 | 0 | 0 | 0 | 0 | 0 | 0 | | 0 | 1 |
| AA | 0.25 | 0.85 | 0.20 | 0.10 | | 0.15 | 0.45 | 0.05 | 0.05 | 0.10 | 0.05 | 0.05 | | 0.05 | 0.05 |

FIG. 9A

| SEARCH WORD "HEART-WARMING" | | | | | | | | | | | | | | |
|---|---|---|---|---|---|---|---|---|---|---|---|---|---|---|
| NON-MATCHING HISTORY INFORMATION | | | | | | | | | | | | | | |
| STORAGE ADDRESS | CONSTITUENT WORDS | | | | ... | KEYS | | | | | | | ... | |
| | LOVE | SEA | THO-UGHT | HOPE | | C MAJOR | A MINOR | F MAJOR | D MINOR | B FLAT MAJOR | G MINOR | E FLAT MAJOR | G MAJOR | E MINOR |
| 0 | 1 | 0 | 0 | 1 | | 0 | 0 | 0 | 0 | 0 | 0 | 1 | 0 | 0 |
| 1 | 1 | 1 | 1 | 1 | | 0 | 0 | 0 | 1 | 0 | 0 | 0 | 0 | 0 |
| 2 | 0 | 1 | 0 | 0 | | 0 | 0 | 0 | 0 | 0 | 0 | 1 | 0 | 0 |
| 3 | 1 | 1 | 0 | 0 | | 0 | 0 | 1 | 0 | 0 | 0 | 0 | 0 | 0 |
| 4 | 1 | 0 | 1 | 1 | | 0 | 0 | 0 | 1 | 0 | 0 | 0 | 0 | 0 |
| 5 | 0 | 0 | 0 | 0 | | 0 | 0 | 0 | 1 | 0 | 0 | 0 | 0 | 0 |
| 6 | 1 | 1 | 0 | 1 | | 0 | 0 | 0 | 1 | 0 | 0 | 0 | 0 | 0 |
| 7 | 1 | 0 | 0 | 0 | | 0 | 0 | 0 | 0 | 0 | 0 | 1 | 0 | 0 |
| 8 | 1 | 1 | 1 | 0 | | 0 | 0 | 0 | 0 | 0 | 0 | 1 | 0 | 0 |
| 9 | 1 | 0 | 0 | 1 | | 0 | 1 | 0 | 0 | 0 | 0 | 0 | 0 | 0 |
| 10 | 0 | 1 | 0 | 0 | | 0 | 0 | 0 | 0 | 0 | 0 | 0 | 0 | 0 |
| 11 | 1 | 1 | 0 | 0 | | 0 | 0 | 0 | 1 | 0 | 0 | 0 | 0 | 0 |
| 12 | 1 | 0 | 0 | 0 | | 0 | 0 | 0 | 1 | 0 | 0 | 0 | 0 | 0 |
| 13 | 1 | 1 | 1 | 1 | | 0 | 0 | 0 | 0 | 0 | 0 | 0 | 0 | 1 |
| 14 | 0 | 1 | 0 | 0 | | 1 | 0 | 0 | 0 | 0 | 0 | 1 | 0 | 0 |
| 15 | 0 | 0 | 1 | 0 | | 0 | 0 | 0 | 0 | 1 | 0 | 0 | 0 | 0 |
| 16 | 1 | 0 | 0 | 0 | | 0 | 0 | 0 | 1 | 0 | 0 | 0 | 0 | 0 |
| 17 | 1 | 1 | 0 | 1 | | 0 | 0 | 0 | 0 | 0 | 0 | 1 | 0 | 0 |
| 18 | 1 | 1 | 0 | 0 | | 0 | 0 | 0 | 1 | 0 | 0 | 0 | 0 | 0 |
| 19 | 0 | 1 | 0 | 0 | | 0 | 0 | 0 | 0 | 0 | 0 | 0 | 0 | 0 |
| DA | 0.70 | 0.60 | 0.25 | 0.35 | | 0.05 | 0.05 | 0.05 | 0.04 | 0.05 | 0.00 | 0.30 | 0.00 | 0.05 |

FIG. 9B

| | CONSTITUENT WORDS | | | | ... | KEYS | | | | | | | ... | |
|---|---|---|---|---|---|---|---|---|---|---|---|---|---|---|
| | LOVE | SEA | THO-UGHT | HOPE | | C MAJOR | A MINOR | F MAJOR | D MINOR | B FLAT MAJOR | G MINOR | E FLAT MAJOR | G MAJOR | E MINOR |
| AA-DA | -0.45 | 0.25 | -0.05 | -0.25 | | 0.10 | 0.40 | 0.00 | -0.35 | 0.05 | 0.05 | -0.25 | -0.05 | 0.00 |
| CONFIDENCE LIMIT INTERVAL | 0.32 | 0.26 | 0.30 | 0.22 | | 0.26 | 0.37 | 0.16 | 0.22 | 0.16 | 0.16 | 0.16 | 0.16 | 0.16 |
| VOCAL FEATURE "HEARTWARMING" CONVERSION TABLE | -0.45 | 0.00 | 0.00 | -0.25 | | 0.00 | 0.40 | 0.00 | -0.35 | 0.00 | 0.00 | -0.25 | 0.00 | 0.00 |

T — TT

INFORMATION SEARCH APPARATUS, INFORMATION SEARCH METHOD, AND INFORMATION RECORDING MEDIUM ON WHICH INFORMATION SEARCH PROGRAM IS COMPUTER-READABLY RECORDED

BACKGROUND OF THE INVENTION

1. Field of the Invention

The present invention relates to an information search apparatus, an information search method, and an information recording medium on which an information search program is computer-readably recorded, and more particularly to a song search apparatus and a song search method in which one song or a plurality of songs including lyrics and performances (prelude, accompaniment, interlude, and postlude; hereinafter, 'prelude, accompaniment, interlude, and postlude' referred to as 'performance') are searched, and an information recording medium on which a song search program is computer-readably recorded.

2. Related Art Recently, digital data for reproducing a plurality of songs are stored by an onboard navigation apparatus or a home server apparatus or the like, and favorite songs among them are selected and reproduced.

At this time, in prior arts, as a first song search method, it is common that part of constituent words (phrases) constituting lyrics included in a song to be reproduced is inputted as it is and the song having lyrics including the constituent words is searched and reproduced.

Further, US 2003 078919 A1 (FIGS. 1 to 3) discloses a second song search method reflecting subjective feeling of a user. There is a search method for preparing a sensitivity table which can be updated with a correlation value between a search keyword (for example, cheerful song or refreshing song) and a feature word (for example, cheerfulness or energetic), preparing each feature word list representing '1' and '0' depending on whether or not there is a feature related to the feature word, and searching a plurality of matched songs on the basis of the sensitivity table and the feature word list when the user inputs a desired search keyword.

On the other hand, Japanese Patent Application Laid-Open Publication No. 2000-122770 (FIG. 2) described that there is known a method of displaying sorted files in a file management system in which pieces of song, documents, etc., are managed as files. In this method, a plurality of file objects are displayed on one X-Y coordinates in such a manner that a plurality of kinds of additional information are added to each file and stored; the order of the files is determined with respect to one of the kinds of additional information according to an instruction (the files are sorted); the X-coordinates of the file objects corresponding to the files to which the additional information is added are associated with the order or the value of one of the kinds of additional information (e.g., registration date and time); the Y-coordinates are associated with the order or the value of another of the kinds of additional information (e.g., the degree of matching with a search key); the sizes of the file objects are associated with still another of the kinds of additional information (e.g., reference frequency).

According to the above-described conventional song search method and search result display method, however, only the degree of similarity of a file found by a search to a search keyword used for the search is displayed. No idea of comparison between a feature of a search keyword itself and a feature of a file such as a piece of song found by a search using the search keyword has been conceived.

SUMMARY OF THE INVENTION

In view of the above-described circumstances, an object of the present invention is to provide a song search apparatus and a song search method capable of graphically displaying a feature of a search keyword itself inputted by a user, as well as a feature of a file found by a search using the search keyword to enable the user to grasp as an image the degree of similarity between the feature of the search keyword inputted by the user and the feature of the extracted file, and an information recording medium on which a song search program used for such a song search is computer-readably recorded.

The present invention will be described below. Although reference numerals in the accompanying drawings will be accessorily written as parenthetic numerals for descriptive convenience, the present invention is not limited to the illustrated features.

The above object of the present invention can be achieved by an information search apparatus (S) which searches one or plural songs among a plurality of songs including lyrics and performances, provided with: a song feature information storing device (3) which distinguishably stores song feature information indicating at least one of acoustic feature of the performances included in the song and feature of the lyrics included in the song, for every song; a search word input device (9) which is used to input a search word representing the song to be searched and formed of a word representing a subjectivity; a search song feature information storing device (4) which distinguishably stores search song feature information indicating at least one of the acoustic feature of the performances included in any one of the songs to be searched by using the inputted search word as a piece of song appropriate to the subjectivity represented by the inputted search word and the feature of the lyrics included in the song, for every search word; a comparison device (8) which compares input search song feature information as the search song feature information corresponding to the inputted search word with each of the stored song feature information; an extracting device (8) which extracts a song corresponding to the song feature information having the best similarity to the input search song feature information, as the song corresponding to the inputted search word, based on the comparison result of the comparison device (8); a first display control device (8) which makes a display device (12) display an input search song feature information image which is an image indicating the details of the input search song feature information; and a second display control device (8) which makes the display device (12) display an extracted song feature information image which is an image indicating the details of the song feature information corresponding to the extracted song.

The above object of the present invention can be achieved by an information search method executed in an information search apparatus (S) which searches for one or plural songs among a plurality of songs including lyrics and performances, and which comprises a song feature information storing device (3) which distinguishably stores song feature information indicating at least one of acoustic feature of the performances included in the song and feature of the lyrics included in the song, for every song; a search song feature information storing device (4) which distinguishably stores search song feature information indicating at least one of the acoustic feature of the performances included in any one of the songs to be searched by using the inputted search word as a piece of song appropriate to the subjectivity represented by a search word representing the song to be searched and formed of a word representing a subjectivity and the feature of the lyrics included in the song, for every search word; and a display device (12), provided with: a search word input process which inputs the search word; a comparison process which compares input search song feature information as the search song feature information corresponding to the inputted search word with each of the stored song feature information; an extracting process which extracts a song corresponding to the song feature information having the best similarity to the input search song feature information, as the song corresponding to the inputted search word, based on the comparison result in the comparison process; a first display control process which makes the display device (12) display an input search song feature information image which is an image indicating the details of the input search song feature information; and a second display control process which makes the display device (12) display an extracted song feature information image which is an image indicating the details of the song feature information corresponding to the extracted song.

The above object of the present invention can be achieved by an information recording medium on which an information search program is recorded so as to be readable through a computer which is included in an information search apparatus (S) which searches one or plural songs among a plurality of songs including lyrics and performances with a pre-installed re-writable recording medium, wherein the information search program causes the computer to function as: a song feature information storing device (3) which distinguishably stores song feature information indicating at least one of acoustic feature of the performances included in the song and feature of the lyrics included in the song, for every song; a search word input device (9) which is used to input a search word representing the song to be searched and formed of a word representing a subjectivity; a search song feature information storing device (4) which distinguishably stores search song feature information indicating at least one of the acoustic feature of the performances included in any one of the songs to be searched by using the inputted search word as a piece of song appropriate to the subjectivity represented by the inputted search word and the feature of the lyrics included in the song, for every search word; a comparison device (8) which compares input search song feature information as the search song feature information corresponding to the inputted search word with each of the stored song feature information; an extracting device (8) which extracts a song corresponding to the song feature information having the best similarity to the input search song feature information, as the song corresponding to the inputted search word, based on the comparison result of the comparison device (8); a first display control device (8) which makes a display device (12) display an input search song feature information image which is an image indicating the details of the input search song feature information; and a second display control device (8) which makes the display device (12) display an extracted song feature information image which is an image indicating the details of the song feature information corresponding to the extracted song.

BRIEF DESCRIPTION OF THE DRAWINGS

FIG. 1 is a block diagram showing a schematic configuration of a song search apparatus related to an embodiment of the present invention;

FIG. 2A illustrates the data structure of song feature information and FIG. 2B illustrates the data structure of search song feature information;

FIG. 3 is a flow chart showing a song search process related to the embodiment;

FIG. 6A illustrates a data structure of matching history information and FIG. 6B illustrates a data structure of non-matching history information;

FIG. 7 is a flow chart showing in detail a process of updating the conversion table;

FIG. 8 illustrates a specific example (I) of the process of updating the conversion table;

FIGS. 9A and 9B illustrate a concrete example (II) of the process of updating the conversion table.

DESCRIPTION OF THE PREFERRED EMBODIMENTS

Figure 4:
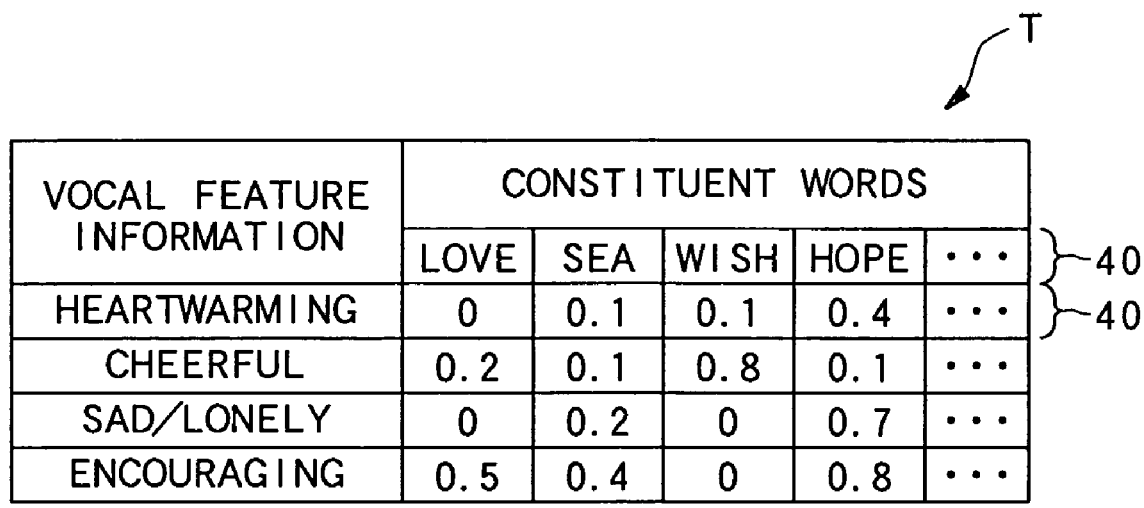
FIG. 4 illustrates a conversion table related to the embodiment.

Hereinafter, best embodiments of the present invention will now be described with reference to the drawings. Also, the below-mentioned embodiment is a case in which the present invention is applied to a song search apparatus for storing a plurality of songs and searching and outputting (reproducing) any one of songs according to a request of a user.

(I) Overall Configuration and Whole Operation

First, the overall configuration and the whole operation of the song search apparatus according to the present embodiment will be explained with reference to FIGS. 1 and 2. In addition, FIG. 1 is a block diagram showing the schematic configuration of the song search apparatus, and FIG. 2A and FIG. 2B illustrate the data structure of information accumulated in the song search apparatus.

As shown in FIG. 1, the song search apparatus S according to the present embodiment comprises a song input unit 1, a song database 2 as a song storing device, a song feature information database 3 as a song feature information storing device, a search song feature information database 4 as a search song feature information storing device, a sound feature information extracting unit 5, a constituent word information extracting unit 6, a song feature information generating unit 7, a search process unit 8 as a comparison device, an extracting device, a first display control device, a second display control device, and a replacing device, an input unit 9 as a search word input device, an evaluation information input device, a first change input device, and a second change input device, a song output unit 10, a history storage unit 11, and a display 12 as a display device.

At this time, in the song database 2, a plurality of songs are accumulated and stored as an object to be searched by the below-mentioned song search process. Further, each of the songs is comprised of at least lyrics and a performance including prelude, accompaniment, interlude, and postlude.

Here, a song which is desired to be accumulated is inputted into the song database 2, when song information Ssg corresponding to the song is inputted into the song input unit 1 from the outside, by performing the format conversion process etc. for storing the song information Ssg in the song database 2 at the song input unit 1 to input the processed song information Ssg into the song database 2.

Next, the song feature information database 3 is accumulated with song feature information corresponding to all the songs accumulated in the song database 2 such that the song feature information can be identified with respect to each of the songs.

Here, the song feature information is accumulated in the song feature information database 3 such that it corresponds to each of all the songs accumulated in the song database 2, and is the information characterizing the respective lyrics and performance of each of the songs.

Next, the song feature information will be explained with reference to FIGS. 1 and 2A.

When a new song is inputted into the song database 2 as song information Ssg, the song feature information is newly generated in accordance with the song and the generated song feature information is newly registered and accumulated in the song feature information database 3.

Here, when anew song is accumulated in the song database 2, the song information Ssg corresponding to the song is read from the song database 2 and is outputted to the sound feature information extracting unit 5 and the constituent word information extracting unit 6, as shown in FIG. 1.

Further, a plurality of parameters representing the acoustic feature of the song are extracted from the song information Ssg and are outputted to the song feature information generating unit 7 as sound feature information Sav by the sound feature information extracting unit 5.

At this time, as the plurality of parameters included in the sound feature information Sav, there are, as shown in the right side of FIG. 2A, for example, a speed (BPM (Beet Per Minutes)) of the song, a maximum output level of the song (maximum sound volume), an average output level of the song (average sound volume), a code included in the song, a beat level of the song (that is, the signal level (magnitude) of the beat component of the song), and the key of the song (C major or A minor).

In parallel to the above, the constituent word information extracting unit 6 extracts lyrics (words of the song) included in the song from the song information Ssg, searches whether or not the constituent words (phrases, hereinafter referred to simply as constituent words) set previously in the extracted lyrics are included, generates constituent word feature information Swd for each of the constituent words indicating the search result (regarding whether or not the constituent words are included in the lyrics), and outputs them to the song feature information generating unit 7.

At this time, the constituent word feature information Swd shows whether or not the constituent words set previously such as 'love', 'sea', 'thought', or 'hope' are included in lyrics constituting a song. When the constituent word is included in the lyrics, the value of the constituent word feature information Swd for the constituent word is defined to be '1', and, when the constituent word is not included in the lyrics, the value of the constituent word feature information Swd for the constituent word is defined to be '0'. More specifically, for example, as shown in the left side of FIG. 2A, the song having the song number '0' in the song database 2 includes the constituent word 'love', but does not include the constituent words 'sea', 'thought', and 'hope'. Similarly, the constituent words "love", "sea" and "hope" are included in the words of a song indicated by a song number "1" in the song database 2, while the constituent word "thought" is not included in the words of the song.

Thereby, the song feature information generating unit 7 combines the sound feature information Sav and the corresponding constituent word feature information Swd for every song, outputs the song feature information Ssp composed of a plurality of entities of song feature information 20 corresponding to each of the songs to the song feature information database 3, as shown in FIG. 2A, and registers and accumulates it in the song feature information database 3. At this time, as shown in FIG. 2A, the song feature information 20 of one song is comprised of the sound feature extracted from the song by the sound feature information extracting unit 5 and the constituent word information extracted from the lyrics of the song by the constituent word information extracting unit 6.

In addition, the search song feature information corresponding to the whole search words previously set as search keywords (that is, the search keywords subjectively characterizing the song which a user wants to listen to at that time, hereinafter, referred to simply as the searchwords) inputted by the user in the below-mentioned song search process is distinguishably accumulated in the search song feature information database 4 for each of the search words.

Here, the search song feature information must be selected and inputted when a user searches songs from the songs accumulated in the song database 2, and it is the information characterizing each of the search words inputted by the user.

Next, the search song feature information will be explained with reference to FIG. 2B in detail.

As shown in FIG. 2B, one entity of search song feature information 30 comprises search song feature information identifying information (shown by 'search ID' in FIG. 2B) for identifying each of the search song feature information 30 from other entities of the search song feature information 30, a search word itself corresponding to the search song feature information 30, lyric feature information characterizing lyrics included in a song to be searched and extracted (in other words, expected to be searched and extracted) from the song database 2 by using the corresponding search word, and sound feature information including the plurality of parameters representing the acoustic feature of the song to be searched and extracted (be expected to be searched and extracted).

Here, the sound feature information constituting the search song feature information 30 specifically includes acoustic parameters similar to those parameters included in the sound feature information Sav.

Also, similarly, the lyric feature information constituting the search song feature information 30 is a collection composed by applying a weight value to each of the plurality of subjective pieces of the lyric feature information characterizing the lyrics included in the song to be searched and extracted by using the search song feature information 30, according to the specific content of the respective lyrics included in the song to be searched and extracted by using the search word corresponding to the search song feature information 30.

More specifically, as shown in FIG. 2B, with respect to the search song feature information 30 corresponding to the search word 'heart-warming', the lyric feature information of 'heart-warming' is formed with the weight value of 0.9 against the other lyric feature information, the lyric feature information of 'heartening' is formed with the weight value of 0.3 against the other lyric feature information, the lyric feature information of 'sad, lonely' is formed with the weight value of 0.1 against the other lyric feature information, and the lyric feature information of 'cheerful' is formed with the weight value of 0 against the other lyric feature information. On the other hand, with respect to the search song feature information 30 corresponding to the search word of 'cheerful', the lyric feature information of 'cheerful' is formed with the weight value of 0.7 against the other lyric feature information, the lyric feature information of 'heart-warming' is formed with the weight value of 0.2 against the other lyric feature information, the lyric feature information of 'heartening' is formed with the weight value of 0.5 against the other lyric feature information, and the lyric feature information of 'sad, lonely' is formed with the weight value of 0 against the other lyric feature information. Also, with respect to the search song feature information 30 corresponding to the search word of 'sad, lonely', the lyric feature information of 'heart-warming' is formed with the weight value of 0.3 against the other lyric feature information, the lyric feature information of 'sad, lonely' is formed with the weight value of 0.8 against the other lyric feature information, and the lyric feature information of 'cheerful' and 'heartening' is formed with the weight value of 0 against the other lyric feature information. Further, with respect to the search song feature information 30 corresponding to the search word of 'heartening' or 'quiet', each of the lyric feature information of 'heart-warming', 'cheerful', 'sad, lonely' and 'heartening' is formed with a predetermined weight value.

Moreover, as mentioned below, in order to obtain the search result of favorite songs of a user, the same subjective concept as the subjective concept represented by each of the lyric feature information is represented by any one of the search words (the search words are the same as the lyric feature information itself). Also, each of the lyric feature information itself represents the feature of the songs (more specifically, the lyrics included in the song) accumulated in the song database 2 but is independent from the search word itself. The detailed description thereof will be mentioned below.

Also, in case a user subjectively searches a desired song by using the information accumulated in the song feature information database 3 and the search song feature information database 4, after any search word is inputted at the input unit 9 by the user, input information Sin representing the inputted search word is outputted to the search process unit 8.

Thereby, the search process unit 8 extracts one entity of the search song feature information 30 corresponding to the inputted search word from the search song feature information database 4 as search song feature information Swds on the basis of the input information Sin, and simultaneously extracts a plurality of entities of the song feature information 20 corresponding to the entire songs accumulated in the song database 2 from the song feature information database 3 as song feature information Ssp. Then, the extracted entity of the search song feature information 30 is compared with those of the song feature information 20, and song identifying information Srz representing the songs corresponding to the entities of the song feature information 20 which have the best similarity to the entity of the search song feature information 30 are generated and outputted to the song database 2. In parallel with these operations, the search process unit 8 generates a display signal Sdp to display a image representing the search song feature information 30 extracted from the search song feature information database 4 in correspondence with the inputted search word (hereinafter referred to as "search song feature information image") and a image representing the song feature information 20 recognized as most similar to the extracted search song feature information 30 (hereinafter referred to as "song feature information image") as images having a common composition on the display 12, and outputs the display signal Sdp to the display 12. A concrete example of the composition of the search song feature information image and the song feature information image will be described below in detail.

Thereby, the song database 2 outputs the song represented by the song identifying information Srz to the song output unit 10 as song information Ssg.

Then, the song output unit 10 performs an output interface process etc. needed for the output song information Ssg and outputs the processed song information Ssg to an external amplifier unit or a broadcasting unit or the like (not shown).

Also, after the song information Ssg representing one song is outputted from the song output unit 10, evaluation information regarding whether or not the song corresponding to the outputted song information Ssg is appropriate for a song required by a user who initially inputs a search word, is again inputted into the input unit 9, and the corresponding input information Sin is outputted to the search process unit 8.

Thereby, the search process unit 8 generates history information representing the result of the past song search process on the basis of the evaluation information inputted as the input information Sin, and temporarily stores history information Sm in the history storage unit 11 and reads out it if necessary to perform the below-mentioned history managing process.

(II) Song Search Process

Figure 5:
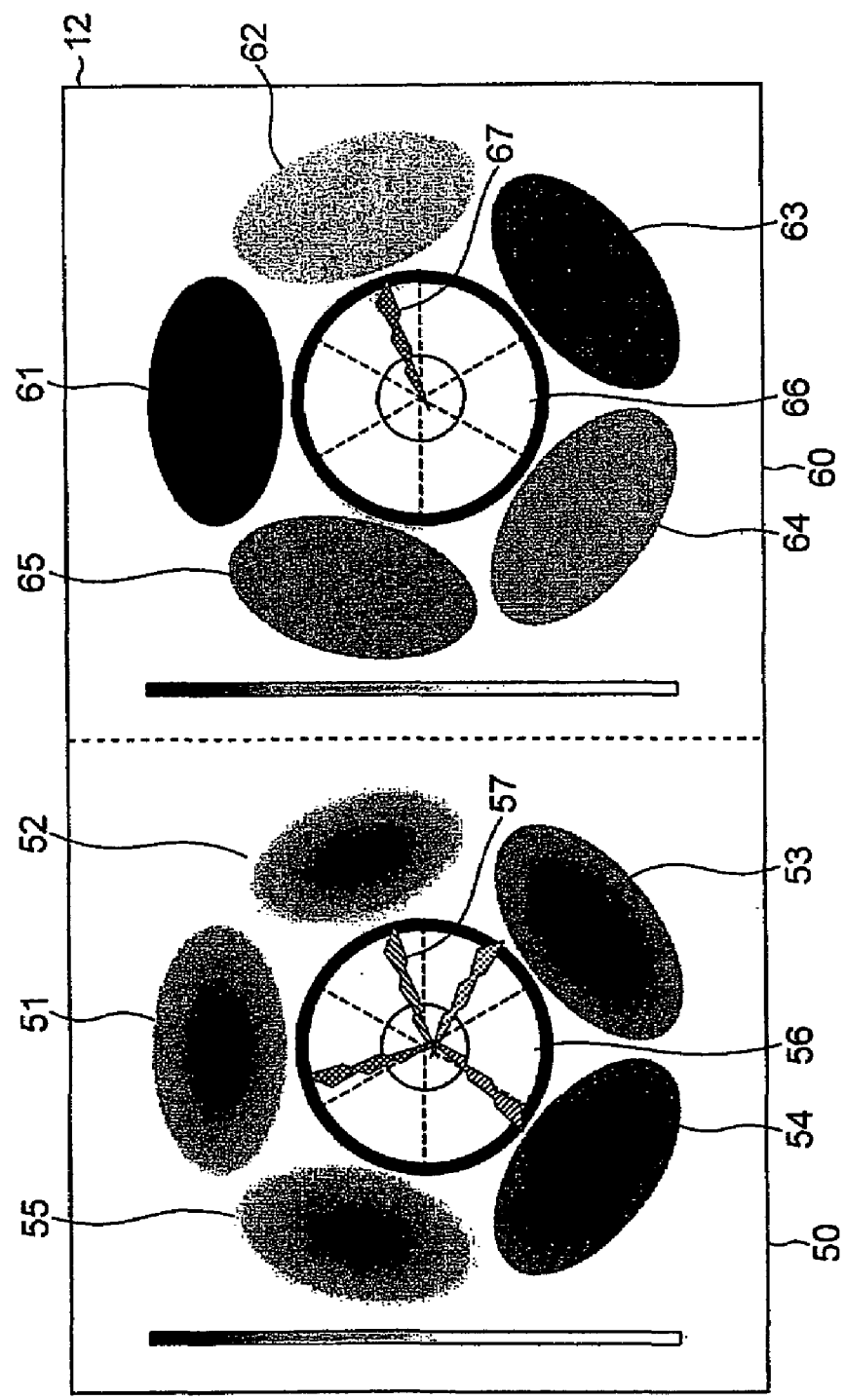
FIG. 5 is a diagram showing an example of display of a search song feature information image and a song feature information image.
Figure 10:
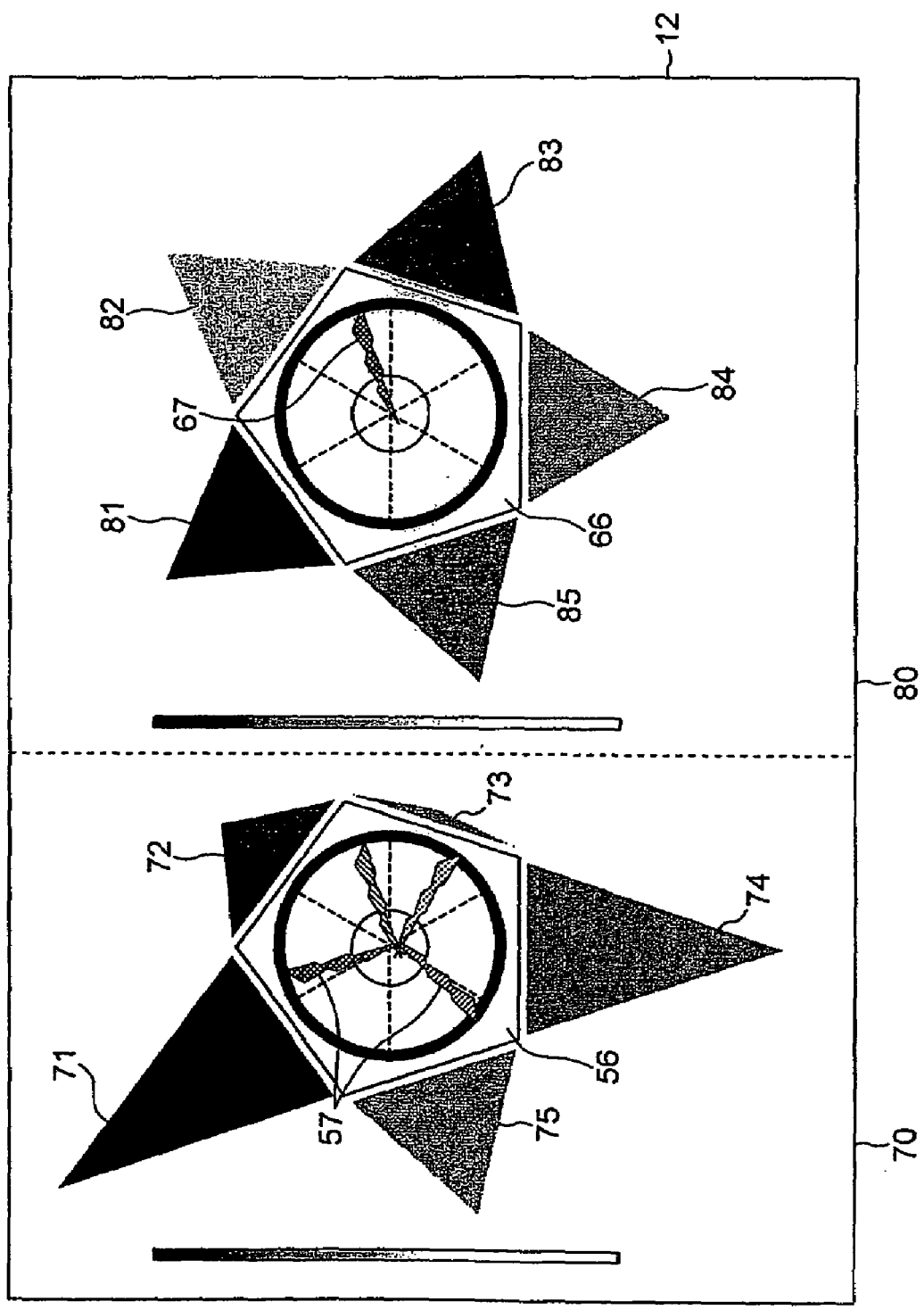
FIG. 10 is a diagram showing another example of display of a search song feature information image and a song feature information image.

Next, the song search process related to the embodiment performed by using the song search apparatus S comprising the above-mentioned configuration will be explained with reference to FIGS. 3 to 10 in detail. In addition, FIG. 3 is a flow chart showing the song search process in the song search apparatus, FIG. 4 illustrates the content of a conversion table used in the song search process, FIG. 5 is a diagram showing an example of display of a search song feature information image and a song feature information image, FIG. 6A and FIG. 6B illustrate the history information used in the history process related to the embodiment, FIG. 7 is a flow chart showing the history managing process of the history information, FIGS. 8 and 9 illustrate databases used in the history managing process, and FIG. 10 is a diagram showing another example of display of a search song feature information image and a song feature information image.

As shown in FIG. 3, in the song search process performed on the basis of the search process unit 8, when a desired subjective search word is initially determined and inputted by a user into the input unit 9 (step S1), the entity of the search song feature information 30 corresponding to the inputted search word is extracted from the search song feature information database 4 and is outputted to the search process unit 8 (step S2). The search process unit 8 forms image information for displaying the search song feature information image corresponding to the extracted search song feature information 30 on the display 12 according to the details of the search song feature information 30, and temporarily stores the image information in a memory (not shown) in the search process unit 8 (step S15).

In addition, in parallel with the process of the steps S1 and S2, for every song, the constituent words constituting the lyrics included in the entire songs are read from the song feature information database 3 and then outputted to the search process unit 8 (step S3). Then, for every song, the search process unit 8 performs the process for converting the constituent words into the lyric feature information corresponding to the lyric included in each song by using the conversion table stored in the memory (not shown) in the search process unit 8 (step S4).

Here, the conversion table will be explained with reference to FIG. 4 in detail.

The lyric feature information generated by the process of the step S4 is identical to the lyric feature information with the weight values included in the search song feature information 30, and is a collection composed by applying the weight value to each of the constituent words constituting the lyrics included in the song according to the specific content of each lyric feature information, for every song corresponding to the lyric feature information.

More specifically, in the example of the conversion table T shown in FIG. 4, with respect to lyric feature information 40 of 'heart-warming', the constituent word of 'hope' is formed with the weight value of 0.4 against the other constituent words, the constituent words of 'sea' and 'thought' are formed with the weight value of 0.1 against the other constituent words, the constituent word of 'love' is formed with the weight value of 0 against the other constituent words, and thus the lyric feature information of 'heart-warming' is generated. With respect to the lyric feature information 40 of 'cheerful', the constituent word of 'thought' is formed with the weight value of 0.8 against the other constituent words, the constituent word of 'love' is formed with the weight value of 0.2 against the other constituent words, and the constituent words of 'sea' and 'hope' are formed with the weight value of 0.1 against the other constituent words. With respect to the lyric feature information 40 of 'sad, lonely', the constituent word of 'hope' is formed with the weight value of 0.7 against the other constituent words, the constituent word of 'sea' is formed with the weight value of 0.2 against the other constituent words, the constituent words of 'love' and 'thought' are formed with the weight value of 0 against the other constituent words, and thus the lyric feature information 40 of 'sad, lonely' is generated. Finally, with respect to the lyric feature information 40 of 'heartening', the constituent word of 'hope' is formed with the weight value of 0.8 against the other constituent words, the constituent word of 'sea' is formed with the weight value of 0.4 against the other constituent words, the constituent word of 'love' is formed with the weight value of 0.5 against the other constituent words, the constituent word of 'thought' is formed with the weight value of 0 against the other constituent words and thus the lyric feature information of 'heartening' is generated.

In addition, in the process of the step S4, the corresponding lyric feature information 40 is generated from each constituent word of the song by using the conversion table T shown in FIG. 4. More specifically, for example, in the case of using the conversion table T shown in FIG. 4, when any song includes only the constituent words 'sea', 'thought', and 'hope' among the constituent words in the conversion table T, the value of the lyric feature information 40 of 'heart-warming' for the song becomes 0.6 by adding the values 0.1, 0.1, and 0.4 which are the weight values of the constituent words 'sea', 'thought' and 'hope' in the lyric feature information of 'heart-warming', respectively. Similarly, the value of the lyric feature information 40 of 'cheerful' for the song becomes 1.0 by adding the values 0.1, 0.8, and 0.1 which are the weight values of the constituent words 'sea', 'thought' and 'hope' in the lyric feature information of 'cheerful', respectively. Similarly, with respect to each lyric feature information 40 listed in the conversion table T, each value of the song is determined by adding the weight values corresponding to each constituent word.

In parallel with the processes of the steps S1, S2, S3, and S4, only the sound feature information in each of the song feature information 20 corresponding to the entire songs is read from the song feature information database 3 and is outputted to the search process unit 8 (step S5).

Based on these, in the search process unit 8, for every song, the lyric feature information included in one entity of the search song feature information 30 (including the weight values of the lyric feature information 40) extracted at the step S2 is compared with the entity of the lyric feature information 40 corresponding to each song converted at the step S4, and the sound feature information included in the search song feature information 30 is compared with the sound feature information corresponding to each song extracted at the step S5, and then the similarity between the lyric feature information 40 and sound feature information corresponding to each song and those corresponding to the inputted search word is calculated for every song (step S6).

Further, based on the similarity calculated for each song, a reproduction list in which the songs to be outputted are arranged in higher order of the similarity is prepared (step S7), and the songs arranged in the order equal to that of the reproduction list are extracted from the song database 2 and are outputted to the song output unit 10 (step S8).

In parallel with the above-described song output process in step S8, the search process unit 8 forms image information for displaying a song feature information image corresponding to the song feature information 20 corresponding to the output piece of song on the display 12 according to the details of the song feature information 20. The search process unit 8 generates the display signal Sdp including the formed image information corresponding to the song feature information image and the image information corresponding to the search song feature information image, formed and stored in the process in step S15, and outputs the display signal Sdp to the display 12 to simultaneously display the search song feature information image and the song feature information image on one screen in a state of being juxtaposed with each other (step S16).

The displayed form of these images will be concretely described with reference to FIG. 5.

As shown in FIG. 5 by way of example, the search song feature information image 50 and the song feature information image 60 are simultaneously displayed on the display 12 in a state of being juxtaposed with each other.

More specifically, the song feature information image 60 includes, for example, as shown in a right unit of FIG. 5, a key image 66 which is a image indicating a key of the piece of song characterized by the song feature information 20 with which the song feature information image 60 is associated, and feature images 61 to 65 around the key image 66, the feature images 61 to 65 containing some information items set in advance from the parameters included in the sound feature information included in the song feature information 20 and the lyric feature information formed by using the constituent words included in the song feature information 20.

The key image 66 contains only one arrow 67 indicating one of 24 keys (more specifically, "C major", "A minor", "F major", "D minor", "B$_b$ major", "G minor", "E flat major", "C minor", "A flat major", "F minor", "D flat major", "B flat minor", "G flat major", "E flat minor", "B major", "G sharp minor", "E major", "C sharp minor", "A major", "F sharp minor", "D major", "B minor", "G major" and "E minor") (i.e., expressing one piece of song by one representative key). The color of the arrow 67 indicating one of the keys and the position and direction in which the arrow 67 is displayed (the display position and direction in the circle forming the key image 66) are determined in advance. The arrow 67 indicating the key included in the song feature information 20 is displayed in one of the predetermined display positions and one of the predetermined display directions.

In the feature images 61 to 65, a predetermined number of information items (five items in the case shown in FIG. 5) in the lyric feature information which is obtained by converting, by means of the conversion table T shown in FIG. 4, the constituent words included in the lyrics contained in the piece of song characterized by the song feature information 20, and which characterizes the piece of song, and the parameters included as sound feature information in the song feature information 20 (except the parameter indicating the key) (see FIG. 2A) are displayed in display positions set in advance (corresponding to the apexes of a pentagon the center of which corresponds to that of the key image 66 in the case shown in FIG. 5). For example, the feature image 61 is associated with the lyric feature information "Heart-warming" on the piece of song, the feature image 62 with the parameter "BPM" of the piece of song, the feature image 63 with the lyric feature information "Cheerful" on the piece of song, the feature image 64 with the parameter "Maximum Level" of the piece of song, and the feature image 65 with the parameter "Average Level" of the piece of song. In each of the feature images 61 to 65, the value of the lyric feature information or the parameter shown as the feature image is expressed by a color set in advance as a value normalized by using the maximum value and the minimum value that the lyric feature information or the parameter can take.

The feature images indicating the parameters included as sound information in the song feature information 20 in the above-described feature images 61 to 65 may be formed in such a manner that when the value of the parameter indicated as the feature image is changed during playback of the piece of song, the color or the shape of the corresponding feature image is changed according to the change in the parameter value.

On the other hand, the search song feature information image 50 includes, for example, as shown in a left unit of FIG. 5, a key image 56 which includes one or a plurality of arrows 57, and which is shown as one or a plurality of keys appropriate to the piece of song to be searched for by using the search word characterized by the search song feature information 30 with which the search song feature information image 50 is associated, each of the arrow 57 being changed in color according to the degree of appropriateness of the corresponding key (hereinafter referred to as "correlation value"). The key image 56 is displayed at a center of the search song feature information image 50. The search song feature information image 50 also includes feature images 51 to 55 around the key image 56, the feature images 51 to 55 containing some information items set in advance in correspondence with the feature images 61 to 65 from the parameters included in the sound feature information included in the search song feature information 30 and the lyric feature information included in the search song feature information 30.

The key image 56 contains one of a plurality of arrows 57 representing some of the 24 keys described above with respect to the song feature information image 60. The position and direction in which the arrow 57 representing one of the keys is displayed are determined in advance, as are those in the case of the song feature information image 60. Each of the arrows 57 indicating the keys included in the search song feature information 30 is displayed in one of the predetermined display positions and one of the predetermined display directions. The colors of the arrows 57 in the key image 56 are displayed according to the above-described 24 keys and the values of correlation between the 24 keys and the key of the piece of song to be searched for by using the search word. For example, one of the keys having a negative correlation value is indicated by displaying blue arrow 57 in the corresponding display position and direction set in advance, and one of the keys having a positive correlation value is indicated by displaying red arrow 57 in the corresponding display position and direction set in advance. The absolute value of each correlation value is expressed by the depth of the color of the corresponding arrow 57 (red or blue), the depth being increased if the absolute value is increased.

In the feature images 51 to 55, a predetermined number of information items (five items in the case shown in FIG. 5) in the lyric feature information included in the search song feature information 30 and the parameters included as sound feature information in the search song feature information 30 (except the parameter indicating the key) (see FIG. 2B) are displayed in display positions set in advance in correspondence with the above-described song feature information image 60) (the positions corresponding to the apexes of a pentagon the center of which corresponds to that of the key image 56 in the case shown in FIG. 5). For example, in the case shown in FIG. 5, the feature image 51 corresponding to the feature image 61 in the song feature information image 60 is associated with the lyric feature information "heart-warming" included in the search song feature information 30; the feature image 52 corresponding to the feature image 62 in the song feature information image 60, with the parameter "BPM" included in the search song feature information 30; the feature image 53 corresponding to the feature image 63 in the song feature information image 60, with the lyric feature information "cheerful" included in the search song feature information 30; the feature image 54 corresponding to the feature image 64 in the song feature information image 60, with the parameter "Maximum Level" included in the search song feature information 30; and the feature image 55 corresponding to the feature image 65 in the song feature information image 60, with the parameter "Average Level" included in the search song feature information 30. In each of the feature images 51 to 55, the value of the lyric feature information or the parameter shown as the feature image is expressed by a color set in advance as a value normalized by using the maximum value and the minimum value that the lyric feature information or the parameter can take, as is that in each of the above-described feature images 61 to 65. Further, in each of the feature images 51 to 55, each of the weights assigned to the lyric feature information items included in the search song feature information 30 (see FIG. 2B and the relating portion of the description) is indicated by means of varied gradations in relation to the background such that if the weight value is increased, the contrast with the background is increased by reducing the gradation effect and the coloring becomes closer to the solid state, and that if the weight value is reduced, the contrast with the background is reduced by increasing the gradation effect.

When one song is outputted by the process in step S8, the user listening to the outputted song evaluates whether or not the outputted song is appropriate for the inputted search word at the step S1 and inputs the evaluation result by using the input unit 9 (step S9).

Further, when the outputted song is appropriate for the search word (step S9; matching), the below-mentioned matching history information is updated (step S11), and then the process proceeds to the step S12. On the other hand, when the outputted song is inappropriate for the search word at the evaluating step S9 (step S9: non-matching), the below-mentioned non-matching history information is updated (step S10), and then the process proceeds to the step S12.

Here, the non-matching history information updated at the above-mentioned step S10 and the matching history information updated at the above-mentioned step S11 will be explained with reference to FIG. 5 in detail.

First, as the matching history information G, as shown in FIG. 5A, in addition to the song feature information 20 of the song which is evaluated to be appropriate for the search word by the evaluation for the search word inputted by the user, based on the constituent word information included in the song feature information 20, the lyric feature information 40 (the lyric feature information 40 corresponding to the song) generated by the method which is identical to the method illustrated at the step S4 with reference to the effective conversion table T is included.

On the other hand, as the non-matching history information NG, as shown in FIG. 5B, in addition to the song feature information 20 of the song which is evaluated to be inappropriate for the search word by the evaluation for the search word inputted by the user, based on the constituent word information included in the song feature information 20, the lyric feature information 40 (the lyric feature information 40 corresponding to the song) generated by the method which is identical to the method illustrated at the above-mentioned step S4 with reference to the effective conversion table T is included, in a similar manner to the case of the matching history information G.

Moreover, when the updating of the history information is finished with respect to the predetermined number of songs, based on the result, the content of the above-mentioned conversion table T and the content of the search song feature information 30 are updated (step S12).

Next, whether the output of the final song in the reproduction list prepared at the above-mentioned step S7 is finished is determined (step S13). When the output of the final song is not finished (step S13: NO), the process returns to the above-mentioned step S8. At the step S8, the next song in the reproduction list is outputted and then the steps S9 to S12 are repeated with respect to the next song. On the other hand, in the determination of the step 13, when the output of the final song is finished (step S13: YES), the song search process is completed.

Next, the update process of the conversion table T at the above-mentioned step S12 will be explained with reference to FIGS. 6 to B.

In the update process of the conversion table T, as shown in FIG. 6, when the search word inputted at the timing for performing the update process is confirmed to have the same subjective feeling as the search word representing the subjective feeling represented by any entity of the song feature information 40 (step S20) and when the subjective feeling is not matched (step S20: NO), the conversion table T is not updated and the process proceeds to the process for updating the next entity of the search song feature information 30.

On the other hand, if the subjective feeling is matched (step S20: YES), then the process proceeds to the update process of the actual conversion table T.

In addition, in the below-mentioned update process, with respect to the predetermined number of the songs (forty songs (twenty appropriate songs and twenty inappropriate songs) in FIGS. 7 and 8), the case of updating the conversion table T corresponding to the search word will be explained, based on the content of the constituent word included in the song which is evaluated to be appropriate for one search word ('heart-warming' in FIGS. 7 and 8) and the content of the constituent word included in the song which is evaluated to be inappropriate for the search word. Also, in FIGS. 7 and 8, only the items needed for the update process of the conversion table T and the items needed for below-described process of computing the above-described correlation value used for display of the key image 56 in the above-described search song feature information image 50 are extracted among the contents of the history information shown in FIG. 5.

In the actual update process, first, for every constituent word of the song which is evaluated to be appropriate for the matching history information (one storage address corresponding to one song, in FIG. 7), all '0's and '1's in the vertical direction of FIG. 7 are added for all the songs (twenty songs) and the added value is divided by the number of the songs ('20' in FIG. 7) to obtain the average value AA (step S21). For example, in the case of the constituent word of 'love' in the matching history information, since the number of the songs including the constituent word of 'love' is five, this number is divided by 20 which is the total number of songs. Thus, the average value AA for the constituent word of 'love' is determined to be 0.25. Further, the average calculating process is performed with respect to all the constituent words.

Next, similarly to the above, with respect to the non-matching history information, for every constituent word of the songs which are evaluated to be inappropriate, all '0's and '1's in the vertical direction of FIG. 7 are added for all the songs and the added value is divided by the total number of the songs to obtain the average value DA (step S21). For example, in the case of the constituent word of 'love' in the non-matching history information, since the number of the songs including the constituent word of 'love' is 14, the average value DA for the constituent word of 'love' is determined to be 0.70 by dividing the number of 14 with the total number of the songs. Further, the average calculating process is performed with respect to all the constituent words.

Here, the larger the difference between the average value AA and the average value DA for every constituent word, the higher the probability of representing the lyric feature information 40 corresponding to the current search word by the constituent word.

However, note that the average values AA and DA calculated by the above-mentioned process are not the result obtained by evaluating for the entire songs stored in the song database 2. Accordingly, the confidence interval of each calculated average value (statistically, referred to as a sample ratio) must be obtained and the difference between the average value AA and the average value DA corresponding to each constituent word, (the absolute value of average value AA–average value DA), must be determined whether it can be used as the weight value of the history information of the constituent word. More specifically, assuming the confidence level of the confidence interval to be 90%, the difference is determined whether it can be used as the weight value of the history information of the constituent word by using the confidence interval calculated by the below-mentioned equation (1). That is, the confidence interval is calculated by the following equation for each constituent word:

$$\text{Confidence interval} = 2 \times 1.65 \times [(AA \times (1-AA))/N]^{1/2} \quad (1)$$

, where N is a number of songs.

Next, when the confidence interval is calculated, the absolute value of the value obtained by subtracting the average value DA from the average value AA is determined whether it is larger than the calculated confidence interval (step S23).

Further, if the absolute value of the value obtained by subtracting the average value DA from the average value AA is larger than the calculated confidence interval (step S23: YES), the difference becomes a reliable value and is employed as the weight value of the corresponding lyric feature information (the lyric feature information of 'heart-warming' in FIG. 7) in the conversion table T, and then is registered (stored) in the corresponding conversion table T (step S24). On the other hand, in the step S23, if the absolute value of the value obtained by subjecting the average value DA from the average value AA is not larger than the calculated confidence interval (step S23: NO), the difference can not be used as a reliable value, and the weight value of the corresponding constituent word in the conversion table T is updated to '0' (step S25).

In addition, in the initial state of the song search apparatus S, since the history information includes the initial values set in advance and the number of songs which becomes the target of the history information is limited, as a result, new history information is stored by overwriting the old history information. Thereby, as the evaluation of the outputted songs is made, the subjective feeling of the user is reflected on the weight values of the conversion table T. This shows that the conversion table T can be updated accordingly in case the subjective feeling changes.

Process of computing the correlation value used for display of arrow 57 in the key image 56 in the above-described search song feature information image 50 will next be described with reference to FIGS. 8 and 9.

This computing process is specifically performed as the same process as the above-described conversion table T update process.

A case of computing process will be described in which with respect to a number of songs set in advance (40 pieces of song (20 appropriate pieces of song and 20 inappropriate pieces of song) in the case shown in FIGS. 8 and 9), the correlation value of a key corresponding to one search word ("heart-warming" in the case shown in FIGS. 8 and 9) is computed on the basis of the keys of the songs evaluated as appropriate to the search word and the keys of the songs evaluated as inappropriate to the search word. Even in a case where one key associated with one song is changed at intermediate points in the song, one main key is associated with the one song. Therefore, only one key takes the value "1" in each horizontal row in FIGS. 8 and 9 with respect to one song.

In actual correlation value computing process, process performed on the matching history information is such that with respect to each of the keys of the songs evaluated as appropriate (one save address corresponding to one song in FIGS. 8 and 9A), all "0s"0 or "1s" are added together in the vertical direction in FIG. 8 through all the songs (20 pieces of song) and the result of this addition is divided by the total number of songs ("20" in the case shown in FIG. 8) to obtain an average value AA (see step S21 in FIG. 7). For example, in the case of C major in the matching history information, the number of songs containing the key (in other words, the number of songs having a value "1" in FIG. 8) is 3. This number is divided by the total number of songs "20" to obtain an average value AA of "0.15" with respect to C major. This average value computing process is executed with respect to all the keys.

Similarly, process performed on the non-matching history information is such that with respect to each of the keys of the songs evaluated as inappropriate, all "0s" or "1s" are added together in the vertical direction in FIG. 9A through all the songs and the result of this addition is divided by the total number of songs to obtain an average value DA (see step S21 in FIG. 7). For example, in the case of C major in the non-matching history information, the number of songs containing the key is 4. This number is divided by the total number of songs to obtain an average value DA of "0.20" with respect to the constituent word "love". This average value computing process is executed with respect to all the keys.

If the difference between the average value AA and the average value DA is larger with respect to one key, the probability of this key being appropriate to the key of the present song (in other words, the correlation value is larger) is increased.

However, the same statistical program as that in the case of the above-described updating of the conversion table T also exists in the correlation value computing process. Therefore, a confidence limit interval of each computed average value is obtained and a check is made as to whether or not the difference between the average value AA and the average value DA corresponding to one constituent word (average value AA–average value DA) can be used as the weight of the history information on the constituent word. More specifically, it is assumed that the confidence coefficient of the confidence limit interval is 90%, and a check is made by using the confidence limit interval computed by an equation (1) shown below (see step 22 in FIG. 7).

After computing the confidence limit interval, a check is made as to whether the absolute value of the value obtained by subtracting the average value DA from the average value AA is equal to or larger than the computed confidence limit interval (see step S23 in FIG. 7).

When the absolute value of the value obtained by subtracting the average value DA from the average value AA is equal to or larger than the confidence limit interval (see step S23 in FIG. 7: YES), this difference is regarded as a reliable value and newly used as the correlation value TT of the key (see step S24 in FIG. 7 and FIG. 9B). When the absolute value of the value obtained by subtracting the average value DA from the average value AA is smaller than the confidence limit interval (see step S23 in FIG. 7: NO), this difference is regarded as not reliable and the correlation value is not updated (see step S25 in FIG. 7).

In the initial state of the song search apparatus S, an initial value of the correlation value set in advance is stored in each group of history information, and the number of pieces of song from which history information is obtained is finite, so that new history information is overwritten on old history information.

As explained above, according to the operation of the song search apparatus S of the present embodiment, since songs are searched by comparing the entity of the search song feature information 30 corresponding to an inputted search word and the entity of the song feature information 20 corresponding to the stored songs, appropriate songs can be certainly searched by the inputted search word, and songs matched to the subjective feeling of a user can be much easily searched, compared with the case of searching songs using only an inputted search word.

Also, the search song feature information image 50 and the song feature information image 60 are displayed on one screen of the display 12. Therefore the details of search song feature information 30 to used for a search according to a search word inputted by a user and the details of song feature information 20 representing a piece of song actually extracted by using the search word can be compared with each other to enable the user to grasp as an image the degree of similarity between a feature of the search word that the user has input and a feature of the extracted piece of song.

The search song feature information image 50 and the song feature information image 60 are simultaneously displayed on the display 12 as images identical in composition to each other and can therefore be easily compared visually with each other.

The degree of weighting of lyric feature information items in search song feature information 30 is expressed by changing the gradations in feature images 51 to 55 to enable a change in the weights to be easily recognized visually.

The values of parameters indicating acoustic features in each of song feature information 20 and search song feature information 30 are displayed so as to be discriminable on a parameter-by-parameter basis, thus enabling small differences between the magnitudes of the parameters for example to be visually recognized.

The magnitudes of lyric feature information indicating feature of lyrics in each of song feature information 20 and search song feature information 30 are displayed so as to be visually recognizable on an item-by-item basis, thus enabling small differences between the magnitudes of the lyric feature information for example to be visually recognized.

The magnitude of each parameter is expressed by changing the color of an image representing the parameter, thus enabling the size of the parameter to be easily recognized visually.

The search song feature information 30 is updated on the basis of evaluation information and the sizes of the feature images 51 to 55 indicating the weights of the lyric feature information in the search song feature information 30 are displayed together with the search song feature information 30, thus enabling the weights of the lyric feature information in the search song feature information 30 and changes in the search song feature information 30 based on the weights to be visually grasped.

In the above-described embodiment, changes in weighting of the lyric feature information on one search word are expressed by changing the gradations in the feature images 51 to 55 in the search song feature information image 50. Alternatively, for example, the lengths of feature images 71 to 75 (corresponding to the feature images 51 to 55 in the search song feature information image 50 shown in the left section of FIG. 5) in a search song feature information image 70 shown in a left section of FIG. 10 may be changed to express changes in the degrees of weighting of the corresponding lyric feature information. In a right section of FIG. 10 is illustrated a song feature information image 80 displayed in a form corresponding to the search song feature information image 70. Feature images 81 to 85 in the song feature information image 80 (corresponding to the feature images 61 to 65 in the song feature information image shown in the right section of FIG. 5) are also formed into triangular shapes in conformity with the search song feature information image 70. In FIG. 10, the same components as the images shown in FIG. 5 are indicated by the same reference numerals.

In the case shown in FIG. 10, the magnitudes of weighting of lyric feature information are expressed by changing the sizes of the feature images 71 to 75, thus enabling changes in the weights to be easily recognized visually.

In the above-described embodiment, the arrangement may be such that a user changes the search song feature information 30 corresponding to the displayed search song feature information image 50 or 70 by an operation in the input unit 9.

In such a case, since the user can change the details of the search song feature information 30, a song more appropriate to a user's taste or the like can be extracted by changing the search song feature information 30 according to user's preference.

The arrangement may also be such that the search song feature information 30 corresponding to the displayed search song feature information image 50 or 70 and the weights assigned to the lyric feature information included in the search song feature information 30 are changed by operations in the input unit 9.

In such a case, a piece of song more appropriate to a user's taste or the like can be extracted by changing the search song feature information 30 and the weights of the lyric feature information according to user's preference.

Further, the arrangement may be such that when the search song feature information image 50 or 70 and the song feature information image 60 or 80 are simultaneously displayed, the details of the search song feature information 30 corresponding to the search song feature information image 50 or 70 are replaced in the search processing section 8 with the same details as those of the song feature information 20 corresponding to the song feature information image 60 or 80 simultaneously displayed to be again accumulated in the search song feature information database 4.

In such a case, if a user is satisfied with an extracted song, he or she may replace the search song feature information 30 corresponding to the input search word with the song feature information 20 on the song to enable the extracted song to be again extracted when the search word is again inputted, thus extracting songs more appropriate to user's taste or the like.

In addition, although the case of applying the present invention to the song search apparatus S for accumulating and searching a plurality of songs in the above-mentioned embodiment was explained, the present invention may be applied to the image search apparatus which searches still images or moving images accumulated in accordance with the subjective feeling of a user.

Also, by recording a program corresponding to the flow chart shown in FIGS. 3 and 6 in an information recording media such as a flexible disk, or by obtaining and recording the corresponding program by a network such as Internet, the program is read out and executed by using a general-purpose microcomputer etc. and thus the general-purpose microcomputer can be used as the search process unit 8 related to the embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-412395 filed on Dec. 10, 2003 including the specification, claims, drawings and summary is incorporated herein by reference in its entirety.

What is claimed is:

1. An information search apparatus which searches one or plural songs among a plurality of songs including lyrics and performances, wherein said information search apparatus comprises:
   a song feature information storing device which distinguishably stores song feature information indicating at least one of acoustic feature of the performances included in the song and feature of the lyrics included in the song, for every song;
   a search word input device which is used to input a search word representing the song to be searched and formed of a word representing a subjectivity;
   a search song feature information storing device which distinguishably stores search song feature information indicating at least one of the acoustic feature of the performances included in any one of the songs to be searched by using the inputted search word as a piece of song appropriate to the subjectivity represented by the inputted search word and the feature of the lyrics included in the song, for every search word;
   a comparison device which compares input search song feature information as the search song feature information corresponding to the inputted search word with each of the stored song feature information;
   an extracting device which extracts a song corresponding to the song feature information having the best similarity to the input search song feature information, as the song corresponding to the inputted search word, based on the comparison result of said comparison device;
   a first display control device which makes a display device display an input search song feature information image which is an image indicating the details of the input search song feature information; and
   a second display control device which makes said display device display an extracted song feature information image which is an image indicating the details of the song feature information corresponding to the extracted song.

2. The information search apparatus according to claim 1, wherein said first display control device and said second display control device make said display device simultaneously display the input search song feature information image and the extracted song feature information image by using images identical in composition to each other as the input search song feature information image and the extracted song feature information image.

3. The information search apparatus according to claim 1, further comprising:
   an evaluation information input device which is used to input evaluation information indicating whether or not the extracted song is appropriate for the inputted search word; and
   a search song feature information updating device which updates each of the search song feature information based on the inputted evaluation information, and which generates reliability information indicating reliability of the updated search song feature information, wherein said first display control device makes said display device display, as the input search song feature information image, magnitude of the reliability information corresponding to each of the search song feature information together with the search song feature information.

4. The information search apparatus according to claim 3, wherein
   said first display control device makes said display device display the magnitude of the reliability information by changing the gradation of a image representing the magnitude of the reliability information in the input search song feature information image.

5. The information search apparatus according to claim 3, wherein
   said first display control device makes said display device display the magnitude of the reliability information by changing the size of a image representing the magnitude of the reliability information in the input search song feature information image.

6. The information search apparatus according to claim 1, wherein
   the song feature information and the search song feature information respectively comprise, as parameters indicating the acoustic features of the song, a key parameter indicating a key of the song, an average BPM (beats per minutes) parameter indicating an average tempo of the song, a beat level parameter indicating a level of a signal corresponding to a beat component of the song, a maximum signal level parameter indicating the maximum level of a signal corresponding to the song, and an average signal level parameter indicating an average level of the signal corresponding to the song, and wherein
   said first display control device and said second display control device make said display device display the magnitudes of the parameters in the extracted song feature information image and the input search song feature information image respectively so that the magnitudes of the parameters are visually recognizable.

7. The information search apparatus according to claim 1, wherein
   the song feature information and the search song feature information respectively comprise, as parameters indicating features of the lyrics, a plurality of symbolic parameters which subjectively symbolize the details of the lyrics constituting the song, and which correspond to subjectivities different from each other, and wherein
   said first display control device and said second display control device make said display device display the magnitudes of the symbolic parameters in the extracted song feature information image and the input search song feature information image respectively so that the magnitudes of the symbolic parameters are visually recognizable.

8. The information search apparatus according to claim 6, wherein
   said first display control device and said second display control device make said display device display the extracted song feature information image and the input search song feature information image while expressing the magnitudes of the parameters in the extracted song feature information image and the input search song feature information image by changing colors themselves in which images representing the parameters are depicted.

9. The information search apparatus according to claim 1, further comprising
   a first change input device which is used to input first change information by which a user changes the input search song feature information corresponding to the displayed input search song feature information image.

10. The information search apparatus according to claim 3, further comprising
a second change input device which is used to input second change information for changing each of the input search song feature information corresponding to the displayed input search song feature information image and the reliability information corresponding to the input search song feature information.

11. The information search apparatus according to claim 2, further comprising
a replacing device which, when the input search song feature information image and the extracted song feature information image are simultaneously displayed, replaces the details of the search song feature information corresponding to the displayed input search song feature information image with the same details as those of the song feature information corresponding to the displayed extracted song feature information image, and again stores the replaced details in said search song feature information storing device.

12. The information search apparatus according to claim 1, further comprising a song storing device which stores the plurality of songs.

13. An information search method executed in an information search apparatus which searches for one or plural songs among a plurality of songs including lyrics and performances, and which comprises a song feature information storing device which distinguishably stores song feature information indicating at least one of acoustic feature of the performances included in the song and feature of the lyrics included in the song, for every song; a search song feature information storing device which distinguishably stores search song feature information indicating at least one of the acoustic feature of the performances included in any one of the songs to be searched by using the inputted search word as a piece of song appropriate to the subjectivity represented by a search word representing the song to be searched and formed of a word representing a subjectivity and the feature of the lyrics included in the song, for every search word; and a display device, wherein said information search method comprising:
a search word input process which inputs the search word;
a comparison process which compares input search song feature information as the search song feature information corresponding to the inputted search word with each of the stored song feature information;
an extracting process which extracts a song corresponding to the song feature information having the best similarity to the input search song feature information, as the song corresponding to the inputted search word, based on the comparison result in the comparison process;
a first display control process which makes said display device display an input search song feature information image which is an image indicating the details of the input search song feature information; and
a second display control process which makes said display device display an extracted song feature information image which is an image indicating the details of the song feature information corresponding to the extracted song.

14. An information recording medium on which an information search program is recorded so as to be readable through a computer which is included in an information search apparatus which searches one or plural songs among a plurality of songs including lyrics and performances with a pre-installed re-writable recording medium, wherein the information search program causes the computer to function as:
a song feature information storing device which distinguishably stores song feature information indicating at least one of acoustic feature of the performances included in the song and feature of the lyrics included in the song, for every song;
a search word input device which is used to input a search word representing the song to be searched and formed of a word representing a subjectivity;
a search song feature information storing device which distinguishably stores search song feature information indicating at least one of the acoustic feature of the performances included in any one of the songs to be searched by using the inputted search word as a piece of song appropriate to the subjectivity represented by the inputted search word and the feature of the lyrics included in the song, for every search word;
a comparison device which compares input search song feature information as the search song feature information corresponding to the inputted search word with each of the stored song feature information;
an extracting device which extracts a song corresponding to the song feature information having the best similarity to the input search song feature information, as the song corresponding to the inputted search word, based on the comparison result of said comparison device;
a first display control device which makes a display device display an input search song feature information image which is an image indicating the details of the input search song feature information; and
a second display control device which makes said display device display an extracted song feature information image which is an image indicating the details of the song feature information corresponding to the extracted song.

* * * * *